United States Patent Office 3,215,748
Patented Nov. 2, 1965

3,215,748
HALOGEN SATURATION OF NON-TERMINAL DOUBLE BOND
Charles F. Baranauckas and Samuel Gelfand, Niagara Falls, N.Y., assignors to Hooker Chemical Corporation, Niagara Falls, N.Y., a corporation of New York
No Drawing. Filed May 4, 1960, Ser. No. 26,726
5 Claims. (Cl. 260—653.7)

This invention relates to the halogenation of perchlorofluoro olefins containing a non-terminal double bond by reacting the perchlorofluoroolefin with hydrogen fluoride and chlorine over a zirconium tetrachloride impregnated carbon catalyst. More particularly, this invention relates to the reaction of hydrogen fluoride and chlorine over a catalyst of carbon impregnated with $ZrF_4$, with perchlorofluoroolefins that are completely fluorinated except for a non-terminal carbon-to-carbon double bond having a chloro substituent on each of its carbon atoms to produce saturated perchlorofluorocarbons wherein one of the carbon atoms of the original carbon-to-carbon double bond has two chlorine substituents and the other carbon atom has two fluorine substituents.

It is an object of this invention to provide a new and novel process for the halogenation of perchlorofluorocarbons containing a non-terminal double bond.

Another object is to provide a process such that the raw material is converted to the desired product in high conversion with a minimum of by-product formation, and any unreacted starting material can be recovered and recycled for further conversion to the desired product.

A further object is to provide such a process wherein the product is obtained in high yield.

A further object is to provide a halogenation process wherein the reaction pressure may be maintained at about atmospheric pressure.

A still further object is to provide a process for the halogenation of a non-terminal double bond in unsaturated perchlorofluorocarbons having from four to eight carbon atoms, and wherein all of the saturated carbon atoms therein are perfluorinated, and wherein the non-terminal carbon-to-carbon double bond has a chloro substituent on each of its carbon atoms to produce a saturated perchlorofluorocarbon wherein one of the said non-terminal carbon atoms has two chlorine substituents and the other of said non-terminal carbon atoms has two fluorine substituents.

Other objects will become apparent to those skilled in the art from the description below.

These and other related objects are accomplished by the process of the present invention which comprises halogenating an unsaturated perchlorofluorocarbon starting material having from four to eight carbon atoms having its saturated carbon atoms perfluorinated and containing a non-terminal carbon-to-carbon double bond of the formula —CCl=CCl, to convert said double bond to a saturated unsymmetrical group having the formula —$CF_2$—$CCl_2$— by introducing the starting material, hydrogen fluoride and chlorine into a reaction zone containing a catalyst of carbon impregnated with zirconium tetrafluoride, and maintained at a temperature between about two hundred and fifty degrees centigrade and about six hundred degrees centigrade, and withdrawing the product from said zone.

The exact reactions involved in the process step of this invention are subject to much speculation, but the overall reaction is illustrated by the following equation for 2,3-dichlorohexafluorobutene; however, the scope of the invention is not to be limited to it.

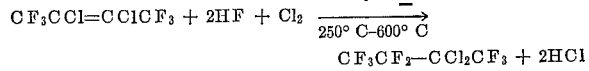

$$CF_3CCl=CClCF_3 + 2HF + Cl_2 \xrightarrow[250°\ C-600°\ C]{ZrF_4\ \text{on}\ C} CF_3CF_2—CCl_2CF_3 + 2HCl$$

The starting compounds are those perhalo compounds which contain from four to eight carbon atoms and have therein a non-terminal carbon-to-carbon double bond of the formula —CCl=CCl—. Some of the other starting materials which may be used in carrying out the process of this invention are: 2,3-dichloroctafluoropentene-2; 2,3-dichlorodecafluorohexene - 2; 3,4 - dichlorohexafluorohexene-3; 2,3-dichlorotetradecafluorooctene-2; and the like.

When the process of this invention is operated at temperatures at the lower end of the temperature range, substantial amounts of other halogenation products as well as unreacted starting material are obtained which must be recycled. At the higher temperatures higher conversions are obtained and the amount of side-products and materials for recycle is reduced. We have found that high conversions to the desired product is increased by maintaining the operating conditions within certain limits and by recycling the other products and unreacted starting material.

The temperature of the operation should be between about two hundred and fifty degrees centigrade and about six hundred degrees centigrade. The preferred temperature range is between about four hundred and fifty degrees centigrade and about five hundred and fifty degrees centigrade.

As will become more evident hereinafter, this invention presents a preferential halogenation technique which is effected by the use of a catalyst of carbon impregnated with zirconium tetrafluoride in conjunction with a critical temperature. Under these conditions the product formed from the defined starting material having a —CCl=CCl— group, is converted to a —$CCl_2$—$CF_2$— group, and substantially no material with a —CClF—CClF— group in it is formed.

The mol ratio of chlorine to perhaloolefin should approach that stoichiometrically required for the reaction, however, ratios above and below one to one may be employed without departing from the scope of this invention.

As will become more evident hereinafter, this invention presents a preferential halogenation technique which is effected by the use of a catalyst of carbon impregnated with $ZrF_4$ in conjunction with a critical temperature.

The ratio of hydrogen fluoride to organic starting material to be reacted should approach that stoichiometrically required to react with the starting material. When utilizing dichlorohexafluorobutene-2 to produce unsymmetrical dichlorooctafluorobutane, maximum conversion with a minimum of unreacted starting material is obtained by maintaining the hydrogen fluoride concentration in excess of the stoichiometric requirement. At high ratios of hydrogen fluoride to starting material however, such as above fifteen to one, the HF may act as a diluent in the reaction zone.

The contact time may vary from about 0.1 second to about sixty seconds with a preferred range being from about 1.0 to thirty seconds.

It is preferred that the reactants be substantially anhydrous.

It is preferred to operate with a mol ratio of hydrogen fluoride to chlorine to starting material of approximately one to one to one.

As long as the reactants are preheated to the desired reaction temperature prior to contact with the catalyst, it matters little in what manner they are introduced. In practice, it is customary to preheat the reactants and introduce them simultaneously into the reaction zone containing the catalyst. In order to help maintain constant reaction conditions, it is convenient to preheat the reagents to the desired reaction temperature prior to contact with the catalyst. Alternatively, it may be convenient for the reactants to be mixed in a preheating zone. After passing through the reaction tube, the reaction products are cooled to separate the gaseous and liquid products, or they may be passed into appropriate solution such as aqueous caustic to remove HF, HCl, chlorine and other materials soluble therein. The organic product is then separated from the aqueous layer, purified by distillation or other means, and any unreacted starting materials recovered for repassing over the catalyst.

Atmospheric pressure was employed in carrying out the process of this invention; however, pressures below and above atmospheric can be used without departing from the scope and spirit of this invention.

The catalyst of this invention is prepared by impregnating a carbon catalyst with a zirconium salt, such as zirconium tetrachloride, in a conventional manner, and then converting the salt to zirconium tetrafluoride by reaction with HF. It is to be understood that other salts of zirconium which can be converted to $ZrF_4$ can also be used.

In the example below the catalyst was prepared by dissolving a soluble zirconium salt which reacts with HF to form $ZrF_4$ such as $ZrCl_4$ in aqueous HCl, evaporating to dryness, and reacting the impregnated carbon with HF at about one hundred and fifty to two hundred degrees centigrade, until the evolution of water and HCl ceased.

For the purposes of this invention contact time is defined as the ratio between the empty volume of the reactor (in arbitrary volume units) and the sum of the rates at which the reactants entered the reactor (in the same arbitrary volume units per unit time). The rates at which the gaseous reactants entered the reactor was obtained from the molar feed rates per unit time with the application of Charles' Law relating the volume of a gas to its absolute temperature (it was assumed that at the temperatures used deviations from ideality were negligible).

In the example below, the reactor comprised a vertically suspended one-inch diameter nickel pipe thirty inches long, electrically heated from the outside and containing a thermowell of three-eights of an inch diameter nickel tubing in the center. The reactor was packed with a catalyst bed of granular carbon impregnated with zirconium tetrafluoride, and maintained at constant temperature. It is within the realm of this invention to employ a horizontal reactor similar in all respects to the vertical reactor. It is also possible to use a fluidized bed reactor. It is to be understood that the invention is not limited to the type of reactor, or the means of heating the catalyst bed described here, since there are several other convenient means for effecting the process of this invention evident to those experienced in the art.

The invention will be more fully understood by reference to the following detailed example. For convenience, the process is described in connection with a specific substance, but it is presented only for the purpose of illustration and not as a limitation, except as defined in the appended claims.

*Example*

Hydrogen fluoride, chlorine, and 2,3-dichlorohexafluorobutene-2, were passed into the above described reactor packed with zirconium tetrafluoride impregnated granular carbon at a mole ratio of approxmately 2.5 to one to one. The temperature of the catalyst bed ranged from four hundred and seventy-five degrees centgrade to five hundred and twenty degrees centigrade. The reaction products issuing from the reactor were passed through an aqueous caustic solution to remove HF, HCl, chlorine and other materials soluble therein. After completion of the addition of the reagents, the reactor was purged with a slow stream of nitrogen gas to complete removal of the reaction products, the organic product was separated from the aqueous layer and dried. The organic product collected represented an eighty-two percent yield, based on the weight of organic charged. An ASTM distillation of the organic product was performed and showed that substantially all of the material distilled between sixty and seventy degrees centigrade at atmospheric pressure. The product was found to consist almost entirely of unreacted 2,3-dichlorohexafluorobutene and the desired 2,2-dichlorooctafluorobutane. The composition of the product was determined by infrared analysis and found to contain twenty-one percent of 2,3-dichlorohexafluorobutene-2 starting material and seventy-eight percent of 2,2-dichlorooctafluorobutane. No 2-chloroheptafluorobutene-2, 2,2,3-chloropheptafluorobutane, or 2,3-dichlorooctafluorobutane was present in the product.

The compound produced by the process of this invention is very stable to chemical attack over a wide temperature range, even in the presence of strong oxidizing agents such as fuming nitric acid. It has been suggested for use as dielectrics and refrigerants and for other applications that take advantage of its properties.

Various other modifications to the process can be made without departing from the spirit of the invention, and we do not wish to be limited to the example which has been given, except as defined in the appended claims.

We claim:

1. The process for the halogenation of an unsaturated aliphatic perchlorofluorocarbon having from four to eight carbon atoms having its saturated carbon atoms, perfluorinated and containing a non-terminal carbon-to-carbon double bond of the formula $-CCl=CCl-$, to convert said double bond to a saturated unsymmetrical group having the formula $-CCl_2-CF_2-$ which comprises: introducing the starting material, hydrogen fluoride and chlorine into a reaction zone containing a catalyst of carbon impregnated with zirconium tetrafluoride and maintained at a temperature between about four hundred and fifty degrees centigrade and about six hundred degrees centigrade, and withdrawing the product from said zone.

2. The process of claim 1 wherein the contact time of the reactants in the reaction zone is from about 0.1 second to about sixty seconds.

3. The process for the production of 2,2-dichlorooctafluorobutane which comprises: introducing 2,3-dichlorohexafluorobutene-2, hydrogen fluoride and chlorine into a reaction zone containing a catalyst of carbon impregnated with zirconium tetrafluoride and maintained at a temperature between about four hundred and fifty degrees centigrade and about six hundred degrees centigrade, and withdrawing the product from said zone.

4. The process of claim 3 wherein the temperature is four hundred and fifty to five hundred and fifty degrees centigrade and the ratio of reactants is approximately one to one to one.

5. The process for the production of 2,2-dichlorooctafluorobutane which comprises: introducing 2,3-dichlorohexafluorobutene-2, hydrogen fluoride and chlorine into a reaction zone containing a catalyst of carbon impregnated with zirconium tetrafluoride and maintained at a temperature between four hundred and fifty degrees centigrade and about six hundred degrees centigrade, withdrawing the product, recovering 2,2-dichlorooctafluorobutane therefrom as product and recycling remaining material for re-use in the process.

References Cited by the Examiner

UNITED STATES PATENTS

| | | | |
|---|---|---|---|
| 2,714,618 | 8/55 | Woolf | 260—653.6 |
| 2,885,449 | 5/59 | Stahl et al. | 260—653.4 |
| 2,981,762 | 4/61 | Woolf | 260—653.7 |

LEON ZITVER, *Primary Examiner.*

ALPHONSO D. SULLIVAN, *Examiner.*